(12) United States Patent
Huchet

(10) Patent No.: US 7,892,616 B2
(45) Date of Patent: Feb. 22, 2011

(54) GLAZING WITH A RIGID ELEMENT OPTIONALLY INCORPORATED INTO AN OVERMOLDED PLASTIC

(75) Inventor: Gérard Huchet, Retheuil (FR)

(73) Assignee: Saint-Gobain Glass France, Courbevoie (FR)

( * ) Notice: Subject to any disclaimer, the term of this patent is extended or adjusted under 35 U.S.C. 154(b) by 452 days.

(21) Appl. No.: 10/503,945

(22) PCT Filed: Feb. 20, 2002

(86) PCT No.: PCT/FR02/00634

§ 371 (c)(1),
(2), (4) Date: Apr. 5, 2005

(87) PCT Pub. No.: WO03/070500

PCT Pub. Date: Aug. 28, 2003

(65) Prior Publication Data

US 2005/0170191 A1    Aug. 4, 2005

(51) Int. Cl.
*B32B 17/06* (2006.01)
*E06B 3/00* (2006.01)

(52) U.S. Cl. .............. 428/38; 52/204.705; 52/204.5; 52/800.14; 52/800.15; 52/204.597

(58) Field of Classification Search .......... 428/38; 52/204.705, 204.5, 800.14, 800.15, 204.597
See application file for complete search history.

(56) References Cited

U.S. PATENT DOCUMENTS

| | | | |
|---|---|---|---|
| 4,249,517 A * | 2/1981 | Schroeder et al. ........... | 126/661 |
| 5,011,523 A | 4/1991 | Roncato et al. | |
| 5,185,979 A | 2/1993 | Azzimonti | |
| 5,399,575 A | 3/1995 | Friebe et al. | |
| 5,409,290 A * | 4/1995 | Grimm et al. ............... | 296/215 |
| 5,533,314 A * | 7/1996 | Kunert ....................... | 52/788.1 |
| 5,944,324 A * | 8/1999 | Schultheis et al. .......... | 277/637 |

FOREIGN PATENT DOCUMENTS

| | | |
|---|---|---|
| DE | 196 14 321 | 10/1997 |
| DE | 199 23 725 | 7/2000 |
| EP | 524 323 | 1/1993 |
| EP | 0599695 A1 * | 11/1993 |
| EP | 0 559 695 A1 | 6/1994 |
| EP | 611-854 | 8/1994 |
| EP | 771 684 | 5/1997 |
| EP | 1 026 022 | 8/2000 |
| FR | 2 516 441 | 5/1983 |
| FR | 2 638 467 | 5/1990 |
| JP | 58-44218 | 3/1983 |
| JP | 62-171313 | 10/1987 |
| JP | 07-336125 | 12/1995 |

(Continued)

*Primary Examiner*—William P Watkins, III
(74) *Attorney, Agent, or Firm*—Oblon, Spivak, McClelland, Maier & Neustadt, L.L.P.

(57) ABSTRACT

A glazing including a glazed element with at least one rigid element that may or may not be incorporated into an overmolded plastic part. The at least one rigid element has a linear thermal expansion coefficient of the same order of magnitude as that of the glazed element. Such a glazing may find, e.g., application to the addition of fixing supports or reinforcing elements to a glazing for buildings, self-propelled or towed terrestrial or marine vehicles.

21 Claims, 1 Drawing Sheet

FOREIGN PATENT DOCUMENTS

| | | |
|---|---|---|
| JP | 2000-071283 | 3/2000 |
| WO | WO 83/01755 | 5/1983 |
| WO | WO 00/57243 | 9/2000 |
| WO | WO 00/71777 A1 | 11/2000 |
| WO | WO0125581 A1 * | 12/2001 |

* cited by examiner

GLAZING WITH A RIGID ELEMENT OPTIONALLY INCORPORATED INTO AN OVERMOLDED PLASTIC

The invention relates to the field of glazing and relates to glazing, particularly for buildings or motor or leisure vehicles, provided with a plastic part overmolded over the glazed element and which incorporates or not a rigid element.

One particular example of glazing of this type in the field of land motor vehicles is given by opening or fixed sunroofs which occupy up to almost the entire roof area. This glazing comprises a glazed element, particularly made of toughened glass, laminated glass or transparent plastic, equipped with a plastic surround overmolded onto the glazed element, which may incorporate rigid elements for fixing to the sunroof drive mechanism. In order to rigidify the glazed element which, as the vehicle travels along, is subjected to deformations due to the pressure associated with the speed of travel, it is common practice for the overmolded surround to be provided with reinforcing elements in the form of metal strips, generally made of steel.

In a technique commonly employed, the reinforcing strips are incorporated into the plastic surround directly during the overmolding operation by placing one or more strips as inserts with the glazed element into the manufacturing mold and then by injecting the plastic in such a way as to incorporate the insert or inserts.

With the temperatures at which thermoplastics are injected, or the heat given off by the polymerization of a two-part polyurethane using a RIM (reaction injection molding) method, which are materials and methods commonly used for this purpose, this technique has the disadvantage of giving rise to deformation of the metal reinforcing elements, firstly in the hot state by expansion in the mold, then, upon leaving the mold, by cold contraction, which deformations introduce stresses and deformations into the glazed element which stresses and deformations may prove inadmissible for mounting in the bodywork from a mechanical and/or esthetic point of view.

To compensate for these deformations, manufacture may be followed by a step of reshaping the glazing by compression, but this leads to deformation of the molded composite, which deformation may detract from the bond at the various interfaces and therefore from the integrity of the glazing.

A similar expansion problem may also be encountered when the vehicle is subjected to prolonged heat, particularly when parked for a long time in full sun. The alternation of heating/cooling cycles then gradually tends to cause inevitable changes to the curve of the glazing, and this detracts from the line of the vehicle.

SUMMARY OF THE INVENTION

It is an object of the present invention to overcome the aforementioned drawbacks.

To this end, the subject of the invention is glazing comprising a glazed element with at least one rigid element which may or may not be incorporated into an overmolded plastic part, characterized in that the rigid element or elements have a linear thermal expansion coefficient of the same order of magnitude as that of said glazed element.

By selecting, for the rigid elements according to the invention, materials which have a linear expansion coefficient similar to that of the glazed element, the appearance of differential expansion stresses in the assembly formed of the glazed element, the plastic and the rigid element(s) is avoided. As a consequence, the design and manufacture of the glazing area simplified, because it is no longer necessary to carry out the additional step of shaping the glazing.

Furthermore, manufacture on the whole is more reliable, because the final dimensions of the glazing are closer to the middle value of the permitted tolerance range, which would not be the case with a metal element.

In the context of the present invention, not only glass elements consisting of one or more sheets of glass bonded together, as appropriate, by adhesive interlayers, but also transparent or translucent elements made of organic material, particularly of polycarbonate, are termed glazed elements.

In the alternative according to the invention whereby the rigid element or elements are not incorporated into an overmolded plastic part, they may be connected to the glazed element, possibly with the ability of sliding one with respect to the other, by any appropriate means such as adhesive bonding, any fixing, gripping or snap-fastening. In this respect, mention may be made of a rigid surround positioned around the glazed element at a relatively high shaping temperature, which contracts as it cools, snap-fastening onto the peripheral edge of the glazed element.

As a preference, the rigid element or elements have a linear thermal expansion coefficient differing from that of the glazed element by $10^{-6}$° C.$^{-1}$ at most.

According to one particular embodiment of the invention, this linear thermal expansion coefficient is of the order of 8 to $10 \times 10^{-6}$° C.$^{-1}$.

A material suited to producing rigid elements according to the invention may be chosen from a wide range of materials, particularly metals, ceramics or other inorganic materials, and composites.

For cost reasons in particular, it is preferable to produce the rigid elements based on glass, particularly in the form of plastic and glass, for example glass fiber, composites. The rigid element has advantageous mechanical behavior when the composite contains at least 60% by volume of glass, preferably at least 75%, particularly at least 80%, especially of the order of 90% glass by volume. The highest values just mentioned are recommended when the glazed element is made of glass, whereas when it is made of polycarbonate or the equivalent, proportions by volume of at least 60%, preferably at least 75%, of glass are more appropriate.

Glass is a material which is practical to use because it introduces no problem of affinity with respect to the organic materials that may be used to form the overmolded part which are already selected for their compatibility with glass. For example, incorporating such a rigid element into an overmolded part made of polyurethane poses no problem of integrity of the composite.

Thanks to the quality of the bond between the rigid element and the overmolded plastic, the final glazing has mechanical performance comparable to that of glazing reinforced with a metal element, and this is true even if the rigid glass element has intrinsic mechanical performance that is inferior to that of a metal element.

A rigid element according to the invention may thus advantageously be characterized by a bending strength, which varies according to the geometry of the element, which is high enough.

An element based on glass also has the advantage of having a weight which is reduced by the order of 30 to 50% by comparison with a rigid metal element. This may be advantageous when the overmolded plastic is more expensive than the material of which the rigid element is made, an increase in the volume of the rigid element giving rise to a corresponding saving in material that is to be overmolded.

Finally, the manufacture of the overmolded glazing is made easier with a rigid element based on glass for which part of this element can be allowed to come into contact with the glass element in the mold, whereas in the case of a metal rigid element, special precautions need to be taken to prevent any glass-to-metal contact. This is because contact between a rigid element based on glass and the surface of the glass glazed element, or the lacquer, if any, covering it, is far less likely to damage these than contact with a metal rigid element.

According to an advantageous feature, said rigid element is a plastic and glass fiber composite. Such a composite can be obtained by any technique known per se for the manufacture of composites, for example by thermoforming (particularly thermocompression) of prepregs.

It is most especially preferable to make the elements from a product consisting of commingled filaments of glass and of organic thermoplastic, available under the tradename Twintex® from Vetrotex Saint-Gobain. The structure and manufacture of these commingled filaments are described in particular in documents FR 2 516 441, FR 2 638 467 and EP 0 599 695.

The manufacture of the rigid elements according to the invention may in particular call for loose commingled filaments or semi-finished products in the form of strips or mats consisting of woven or nonwoven commingled filaments that may possibly be associated with an organic thermoplastic or thermoset. The weaving of the filaments and/or their orientation in one or more favored directions may be selected in a well known way with a view to obtaining desired mechanical properties in given directions.

By way of organic substances that can be used to form a composite rigid element according to the invention, mention may in particular by made of polyolefins such as polyethylene or polypropylene, and of polyesters such as polyethylene terephthalate or polybutylene terephthalate.

These same plastics can be used in the composition of commingled filaments. When a product based on commingled filaments is combined with a plastic, use is advantageously made of a material of the same family as the one present in said filaments, and preferably exactly the same material. These plastics are selected as appropriate for their compatibility with the glazed element when the latter is itself made of plastic: to do this they may consist of the same plastic or of a material which is inert toward the material of the glazed element (which is generally the case with polypropylene for example).

Given the weight saving allowed by the use of a rigid element based on glass, this element can be manufactured with at least one dimension, let us say the thickness, that is large enough to allow all types of fixing of various elements to the glazing, particularly by means of a simple untapped hole which may take a screw or a force-fitting, snap-fastening or other means of connection. The rigid element, which may or may not be inserted in an overmolded plastic, may be made of a material of the Twintex® type, in any shape (lug, etc.) suited to fixing or some other function.

Thus, the invention applies amongst other things to the incorporation into fixed glazing of a fixing support, of a closure mechanism support, and to the incorporation into moving glazing of means of guiding or supports of means of guiding the glazing. The invention also allows an electric wires or electric sensors support to be incorporated, without the fear of a short circuit which is ever present with a metal support element.

The invention also applies to the addition of reinforcing elements to all types of glazing, particularly opening glazing such as sunroofs or opening backlights made of toughened glass or laminated glass for motor vehicles, or non-opening glazing such as glazed sunroofs bonded to the bodywork of a vehicle, the span of which generally entails reinforcing the central part in particular. The rigid element or elements then constitute a longitudinal reinforcing beam or transverse reinforcing hoop, possibly combined with an overmolded plastic into which they are incorporated.

According to yet another alternative form of the invention, the invention applies in particular to sunroofs or backlights which open, made of glass, which are laminated, or made of unhardened glass, or alternatively made of plastic, for motor vehicles or for applications pertaining to buildings.

Of course, this alternative form may also be applied to substrates made of hardened, toughened glass.

These various glass or plastic substrates are provided on one of their sides, or are associated, with at least one electrochemical device, particularly an electrically operable system with variable optical and/or energy properties, this electrochemical device, commonly known as electrochromic device, being of the type described in WO 00/71777 or in WO 00/57243, for example belonging to the same Applicant.

The use of such glazing or of such a substrate is advantageous in electrochromic windows, for buildings, particularly for external glazing or for internal partitions or for glazed doors or for roofs, or for locomotive means of the train, airplane (side window) or automobile (roof, backlight, etc.) type.

The invention may also apply to the incorporation of a reinforcing element into an overmolded accessory, particularly a spoiler attached to the backlight of a vehicle.

The glazing equipped according to the invention may just as easily be glazing for a building, glazing for self-propelled or towed terrestrial motor vehicles such as camping trailers, and for various leisure vehicles, particularly boats etc.

The addition of rigid elements according to the invention may advantageously be performed during the operation of molding the overmolded part, but may also be performed simply by bonding onto the overmolded part.

BRIEF DESCRIPTION OF THE DRAWINGS

Other details and features of the invention will become apparent from the detailed description which will follow, given with reference to the appended drawings in which.

DESCRIPTION OF THE PREFERRED EMBODIMENTS

It is specified for clarity that the various elements of the objects depicted are not necessarily drawn to scale.

Figure 1:
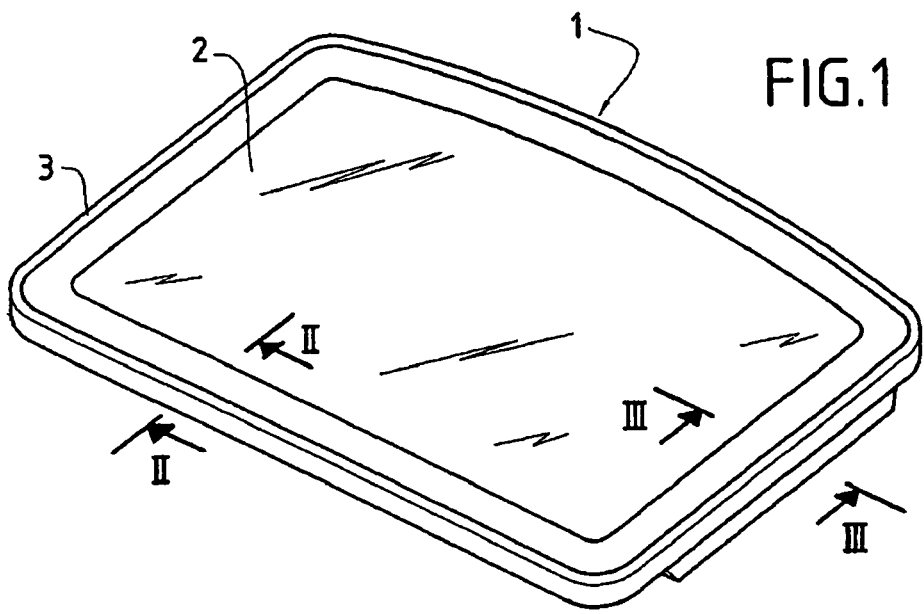
FIG. 1 depicts a perspective view of glazing according to the invention.

The glazing of FIG. 1 is a glazed opening sunroof 1 which comprises a glass element 2, particularly made of toughened glass, provided with an overmolded surround 3 made of any suitable plastic, particularly of polyurethane.

The surround 3 is deposited on a layer 4 of opaque enamel at the periphery of the glass element, and the function of which is to conceal from sight from the outside equipment associated with the glazing.

The surround 3 here runs all the way around the glass element 2, but it must be understood that, as required, it may extend over just part of the periphery thereof.

The surround 3 is in contact with the edge of the glass element and the face of the glass element which will face toward the inside of the vehicle. This allows the opening sunroof 1 to lie flush with the surrounding bodywork.

As an alternative, the surround 3 could be in contact only with the interior face of the glass element 2 or be placed straddling the border of the glass element 2 in contact with both the interior and the exterior faces of the glass element 2.

Figure 2:
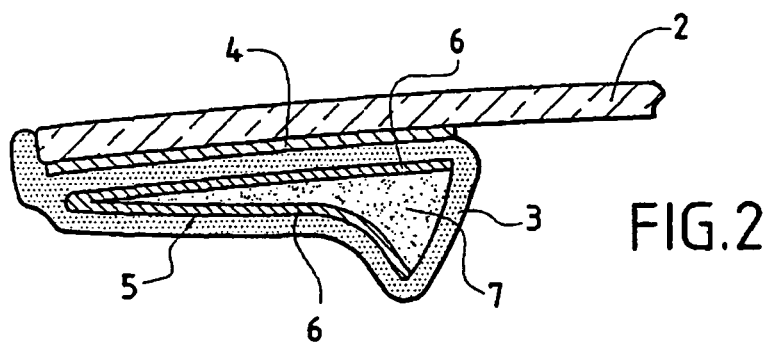
FIGS. 2 and 3 depict views in section of the glazing of FIG. 1 on II-II and III-III respectively.

In FIG. 2, it can be seen that the surround 3 is reinforced along a long side by a reinforcing element 5 which is incorporated into the material 3 of the surround.

The reinforcing element is a glass fiber and plastic composite. It is made, on the one hand, of mats 6 of Twintex® filaments which are commingled filaments of glass and of thermoplastic (in a ratio by volume at least equal to 60/40, preferably to 75/25 and at most equal to 90/10), woven and/or nonwoven, of a thickness of 3 to 20 mm and, on the other hand, of a thermoplastic 7 identical to or different from the one present in the commingled filaments and molded into contact with the mats 6. The mats 6 may be shaped by thermoforming prior to the injection of the material 7 into the mold.

The proportions of the mats 6 and of the plastic 7 are such that the content by volume of glass fiber in the composite reinforcing element 5 is between 60 and 90%. The addition of thermoplastic 7 is optional; the amount added is adjusted as appropriate according to the volumes and sections that are to be obtained.

The linear thermal expansion coefficient of the rigid element according to the invention can be adjusted and mechanical properties equivalent to those of a metal rigid element, which is heavier by 30 to 50%, for varying geometries of the rigid element, can be obtained by adapting the shape, by adjusting the proportion of commingled filaments and, within this, the proportion of glass fibers, or by superposing several plies of Twintex® etc.

Figure 3:
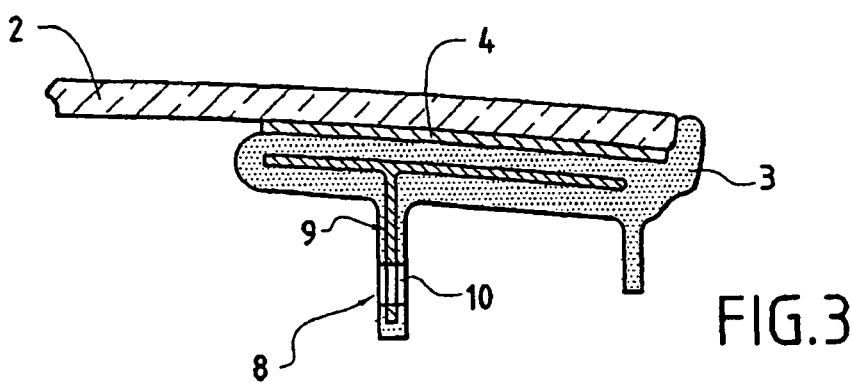

In FIG. 3, it can be seen that another rigid element 8 is incorporated into the surround 3 along a short side. This element 8 serves, on the one hand, to reinforce the glazing and, on the other hand, to attach a roof driving mechanism, not depicted.

The element 8 is made up, in a similar way to the element 5, of mats 9 of commingled filaments of glass and of thermoplastic incorporated into a thermoplastic or thermoset, the materials being identical to or different from those mentioned in respect of the element 5.

An untapped hole 10 is made in a wing of the element 8 to take a part for fixing the mechanism for driving the roof 1.

The rigid elements 5, 8 may be incorporated into the surround 3 at the time that the surround 3 is overmolded onto the glass element 2, by placing them as inserts into the mold, then by injecting the plastic of the surround 3.

During this molding operation, the rigid elements inserted into the mold experience, at the molding temperature, have a thermal expansion on the same order as the glass element 2, which means that no differential expansion stresses occur upon cooling.

As an alternative, at least one of the elements 5, 8 could be bonded to the surround 3 or fixed to it in some other way with the resultant advantage of the disappearance of the differential expansion stresses following the heating/cooling cycles experienced by the glazing throughout its life.

The invention, which has just been described in the particular case of moving glazing for a motor vehicle, is not in any way limited to this embodiment, and encompasses a whole spectrum of variants, particularly as regards the materials used, the configurations of the glazing elements and the systems used for mounting the glazing.

The invention claimed is:

1. A glazing comprising:
a glazed element with an overmolded plastic part; and
at least one rigid element linked to the glazed element,
wherein the glazed element comprises a single sheet with an upper surface, a lower surface and an edge portion therebetween,
wherein the at least one rigid element includes glass and has a linear thermal expansion coefficient differing by $10^{-6}$ °C.$^{-1}$ at most from that of the glazed element,
wherein a surround member which extends over substantially the entire periphery of said at least one rigid element and which interconnects said at least one rigid element with a side surface of said at least one glazed element,
wherein the surround member confines the glazed element exclusively via the lower surface and edge portion of the glazed element, and
wherein the at least one rigid element includes a first portion and a second portion, a first end of the first portion is joined to a first end of the second portion so as to provide an acute angle between the first end of the first portion and the first end of the second portion, a second end of the first portion, opposite the first end of the first portion, and a second end of the second portion, opposite the first end of the first portion, are free,
wherein a thermoplastic is molded into contact with a first face of the first portion and a first face of the second portion, and
wherein a second face of the first portion, opposite the first face of the first portion, and a second face of the second portion, opposite the first face of the second portion, contact the surround member.

2. The glazing as claimed in claim 1, wherein the at least one rigid element is incorporated into the overmolded plastic part.

3. The glazing as claimed in claim 1, wherein the at least one rigid element has a linear thermal expansion coefficient of the order of 8 to $10 \times 10^{-6}$ °C.$^{-1}$.

4. The glazing as claimed in claim 1, wherein the at least one rigid element contains at least 60% by volume of glass.

5. The glazing as claimed in claim 1, wherein the at least one rigid element contains at most 90% by volume of glass.

6. The glazing as claimed in claim 1, wherein the at least one rigid element comprises a plastic and glass fiber composite.

7. The glazing as claimed in claim 6, wherein the composite of the at least one rigid element includes a product comprising commingled filaments of glass and of organic thermoplastic.

8. The glazing as claimed in claim 7, wherein the composite of the at least one rigid element includes loose commingled filaments or semi-finished products in a form of strips or mats consisting of commingled woven or nonwoven filaments.

9. The glazing as claimed in claim 7, wherein the composite of the at least one rigid element includes loose commingled filaments or semi-finished products associated with an organic thermoplastic or thermoset.

10. The glazing as claimed in claim 6, wherein the composite of the at least one rigid element comprises a plastic that includes polyolefins or polyesters.

11. The glazing as claimed in claim 1, wherein the at least one rigid element is a reinforcing element.

12. The glazing as claimed in claim 1, wherein the glazed element includes an electrochemical device, with at least one of variable optical or energy properties.

13. An electrochromic window which includes the glazing as claimed in claim 12.

14. The glazing as claimed in claim 1, wherein said surround member extends over the entire periphery of said at least one rigid element.

15. A glazing comprising:
a glass element formed of one of a glass element consisting of one or more sheets of glass bonded together by adhesive interlayers; and
at least one rigid element overmolded on the glass element, wherein said at least one rigid element is incorporated into an overmolded plastic part, said at least one rigid element having a linear thermal coefficient differing by not greater than $10^{-6}$ °C.$^{-1}$ from that of the glass element, and wherein said at least one rigid element comprises glass; and
a surround member which extends over substantially the entire periphery of said at least one rigid element and which interconnects said at least one rigid element with a side surface of said at least one glazed element,
wherein said surround member confines the glazed element exclusively via a lower surface and an edge portion of said glass element,
wherein the at least one rigid element includes a first portion and a second portion, a first end of the first portion is joined to a first end of the second portion so as to provide an acute angle between the first end of the first portion and the first end of the second portion, a second end of the first portion, opposite the first end of the first portion, and a second end of the second portion, opposite the first end of the first portion, are free,
wherein a thermoplastic is molded into contact with a first face of the first portion and a first face of the second portion, and
wherein a second face of the first portion, opposite the first face of the first portion, and a second face of the second portion, opposite the first face of the second portion, contact the surround member.

16. The glazing as claimed in claim 1, wherein the overmolded plastic part has incorporated therein said at least one rigid element.

17. The glazing as claimed in claim 15, which comprises an enamel layer positioned between the lower surface of said single sheet and said overmolded plastic part.

18. The glazing as claimed in claim 1, wherein the glazed element is free of recesses.

19. The glazing as claimed in claim 1, wherein a portion of the glazed element in contact with the surround member is longer than the at least one rigid element.

20. The glazing as claimed in claim 15, wherein a portion of said glass element in contact with said surround member is longer than said at least one element.

21. The glazing as claimed in claim 1, wherein an enamel layer is positioned between the lower surface of the glazed element and the surround member.

* * * * *